United States Patent [19]
Koss

[11] Patent Number: 5,139,289
[45] Date of Patent: Aug. 18, 1992

[54] TUBE JOINT LOCK DEVICE

[75] Inventor: Christopher R. Koss, W. Chester, Ohio

[73] Assignee: The United States of America as represented by the Secreatry of the Air Force, Washington, D.C.

[21] Appl. No.: 680,653

[22] Filed: Mar. 28, 1991

[51] Int. Cl.⁵ ............................................. F16L 35/00
[52] U.S. Cl. ..................................... 285/80; 285/92; 285/921; 285/87
[58] Field of Search ................. 285/26, 29, 80, 81, 285/82, 87, 92, 921; 411/87, 88

[56] References Cited

U.S. PATENT DOCUMENTS

| | | | |
|---|---|---|---|
| 328,416 | 10/1885 | Lowe et al. | 411/86 |
| 716,204 | 12/1902 | Waldo | 285/80 |
| 1,208,236 | 12/1916 | Thompson | 285/80 |
| 1,473,751 | 11/1923 | Walker | 285/8 |
| 1,858,992 | 5/1932 | Hansen | 285/87 |
| 3,249,370 | 5/1966 | Brogden | 285/81 |
| 3,405,957 | 10/1968 | Chakroff | 285/81 |
| 3,586,351 | 6/1971 | Vanderveen | 285/89 |
| 3,807,774 | 4/1974 | Heath, Jr. | 285/87 |
| 3,813,733 | 6/1974 | Flohr | 285/81 |
| 4,286,807 | 9/1981 | Bächli | 285/89 |
| 4,898,407 | 2/1990 | Zeidler | 285/328 |

FOREIGN PATENT DOCUMENTS

| | | | |
|---|---|---|---|
| 782322 | 6/1935 | France | 285/81 |
| 428149 | 5/1974 | U.S.S.R. | 285/92 |
| 624386 | 6/1949 | United Kingdom | 285/92 |

Primary Examiner—Eric K. Nicholson
Attorney, Agent, or Firm—Robert L. Nathans; Donald J. Singer

[57] ABSTRACT

Nuts used in a conventional tube union connector are prevented from rotating, which would compromise the connector, by mounting a pair of resilient clips over the nuts, the clips having elongated serrated latch members which interlock together to prevent such loosening. This lightweight device is quickly installed and requires no special installation tooling.

8 Claims, 1 Drawing Sheet

TUBE JOINT LOCK DEVICE

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of locking devices and more particularly to devices for locking tubes together.

Fluid bearing tubes, are employed in a wide variety of machines such as aircraft engines, air conditioners and so forth. Such tubes are joined together by well known conventional tube union connectors having nuts for tightly securing terminal tube portions to a central coupler portion after rotation of the nuts.

These tube union connectors are however subject to vibration, particularly when employed in aircraft engines, and the vibration can cause the nuts to be loosened, to in turn compromise the integrity of the connectors. One common solution to this problem is to wire the opposed nuts together by means of a lockwire to prevent such rotation and thus loosening of the nuts.

BRIEF SUMMARY OF AN EMBODIMENT OF THE INVENTION

It is an object of the present invention to eliminate use of the aforesaid lockwire and provide a nut locking device which requires no special tools to install the device, which is retrofittable, which is light in weight, and which is quickly and easily installable.

These objects are obtained by providing resilient clips configured to grip the peripheries of the nuts. First and second elongated latching members extend from the clips and face each other. Each latching member has a plurality of sawtooth like serrations, and when the latching members are brought together as the resilient clips are positioned on the nuts, they become mechanically biased together and become locked due to the serrations.

BRIEF DESCRIPTION OF THE DRAWINGS

Other objects, features and advantages of the present invention will become apparent upon reading the following description, taken in conjunction with the drawings in which.

DESCRIPTION OF AN EMBODIMENT OF THE INVENTION

Figure 1:
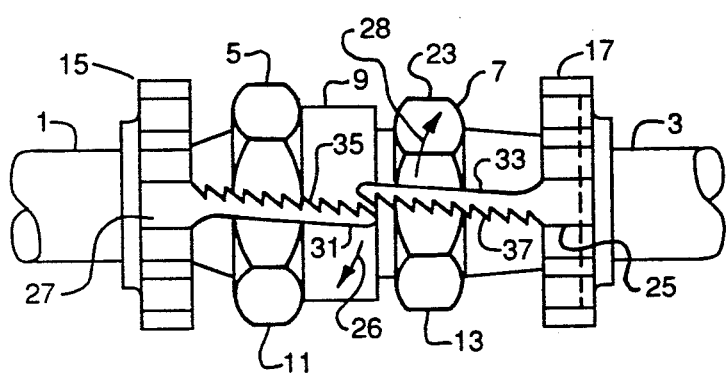
FIG. 1 is a front view of a preferred embodiment of the invention.

Referring to FIG. 1, first tube 1 and second tube 3 could be rigidly affixed to the aforesaid conventional tube union connector by fully rotating nuts 5 and 7. Usually however, only nut 5 rotates, and nut 7 is rigidly affixed to the connector. In any case, relative rotation between the nuts is to be prevented. The terminal tube portions in one form of coupler could have annular flanges thereon which are tightly held against an inner flanged portion (not shown) of the central fluid conducting portion 9 of the connector upon tightening of at least one of the nuts 5 and 7.

Figure 2:
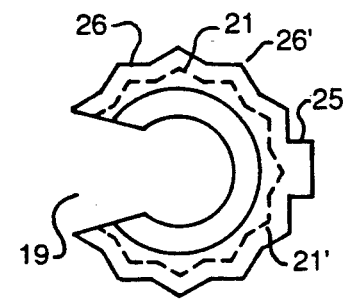
FIG. 2 is a side view of the aforesaid resilient clip.

Resilient gripping means, or disk shaped clips, 15 and 17 have slots 19 shown in FIG. 2 which enable the disk shaped clips to be bent and manually mounted over the tube nuts. The nuts are hexagonal. Indentations 21 and 21' are formed in the circular inner portion of the resilient clips for receiving corresponding peripheral edge portions such as 23, and 23' separating the outer face portions of the nuts as shown in FIG. 1. This prevents relative rotation of the clips with respect to the nuts.

First elongated latch member 31, coupled to clip 15 at 27, and second elongated latch member 33, coupled to clip 17 at 25, are brought together as the clips are slid over the nuts. As this happens, the latch members, extending from the clips in cantilevered fashion, are displaced away from each other due to their resiliency as indicated by arrows 26 and 28.

They then become mechanically biased together and interlock due to sawtooth-like serrations 35 and 37. The result is to form a coupling means, thus coupling the clips together to prevent the rotation of the nuts, which would otherwise loosen them from the coupler. Recall that the indentations such as 21 in FIG. 2, prevent relative rotation of the gripping disks relative to the nuts. The outer pointed portions 26 and 26' of the disks act as knurling elements to permit easy manual rotation of the disks. The lock device could accomodate union connectors of varying lengths due to the configuration of the elongated latch member.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A tube joint lock device comprising:
   (a) a tube union connector having a first tube nut mounted upon a first portion of said tube union connector and a second tube nut mounted upon a second portion of said tube union connector opposite said first portion;
   (b) first and second gripping means for resiliently gripping said first and second tube nuts respectively;
   (c) first and second latch means affixed to said first and second gripping means respectively for locking said first and second gripping means together when said gripping means are gripping said tube nuts, thereby to deter relative rotation of said nuts; and
   wherein said first and second latch means each comprise elongated members having a plurality of serrations therein facing each other for interlocking said elongated members together.

2. The tube joint lock device of claim 1 wherein said first and second gripping means each include a circular inner portion having indentations therein for receiving peripheral edge portions of said nuts, thereby to prevent rotation of said nuts relative to said gripping means.

3. The tube joint lock device of claim 1 wherein said first and second gripping means each comprise a resilient disk shaped clip having a slot therein for enabling manual fitting of said clip over an associated tube nut.

4. The tube joint lock device of claim 2 wherein said first and second gripping means each comprise a resilient disk shaped clip having a slot therein for enabling manual fitting of said clip over an associated tube nut.

5. The tube joint lock device of claim 1 wherein each of said elongated members have a longitudinal axis and said elongated members are resilient in a direction transverse to said longitudinal axis, thereby to enable said serrations to be mechanically biased together.

6. The tube joint lock device of claim 2 wherein each of said elongated members have a longitudinal axis and said elongated members are resilient in a direction transverse to said longitudinal axis, thereby to enable said serrations to be mechanically biased together.

7. The tube joint lock device of claim 3 wherein each of said elongated members have a longitudinal axis and said elongated members are resilient in a direction transverse to said longitudinal axis, thereby to enable said serrations to be mechanically biased together.

8. The tube joint lock device of claim 4 wherein each of said elongated members have a longitudinal axis and said elongated members are resilient in a direction transverse to said longitudinal axis, thereby to enable said serrations to be mechanically biased together.

* * * * *